United States Patent
Huang et al.

(10) Patent No.: US 7,348,534 B2
(45) Date of Patent: Mar. 25, 2008

(54) METHOD FOR CONTROLLING ACTIVE PIXEL ELEMENTS AND ACTIVE PIXEL ARRAYS HAVING A COLUMN-READ TRANSISTOR FOR READING SIGNALS

(75) Inventors: Chien-Chang Huang, Hsin-Chu Hsien (TW); Yi-Chuan Liu, Hsin-Chu Hsien (TW)

(73) Assignee: PixArt Imaging Inc., Hsin-Chu Hsien (TW)

(*) Notice: Subject to any disclaimer, the term of this patent is extended or adjusted under 35 U.S.C. 154(b) by 0 days.

(21) Appl. No.: 11/533,778

(22) Filed: Sep. 21, 2006

(65) Prior Publication Data

US 2007/0108369 A1    May 17, 2007

(30) Foreign Application Priority Data

Nov. 14, 2005    (TW) ............................... 94139905 A (51) Int. Cl.
*H01L 27/00* (2006.01)

(52) U.S. Cl. .................. 250/208.1; 348/294; 348/297; 348/302; 348/308

(58) Field of Classification Search ............. 250/208.1, 250/214 R, 214.1, 214 DC, 214 SW; 348/194, 348/297, 302, 308
See application file for complete search history.

(56) References Cited

U.S. PATENT DOCUMENTS

2005/0205761 A1* 9/2005 Shah ....................... 250/214.1

* cited by examiner

*Primary Examiner*—Georgia Epps
*Assistant Examiner*—Francis M LeGasse, Jr.
(74) *Attorney, Agent, or Firm*—Winston Hsu (57) ABSTRACT

An active pixel element of an image sensor array includes a sensor, a transfer transistor, a reset transistor, and a source follower. There is a column-read transistor positioned in each column of the image sensor array for controlling the read signals. When the sensor is reset, all column-read transistors are turned off while the transfer transistor and the reset transistor are turned on. When a reset signal is read and all column-read transistors are still turned off, the reset transistor is turned on so as to generate the same reset reference voltage when the sensor is reset. In this way, there is no difference in reset reference voltage between each column and between each row for the image sensor array.

6 Claims, 9 Drawing Sheets

METHOD FOR CONTROLLING ACTIVE PIXEL ELEMENTS AND ACTIVE PIXEL ARRAYS HAVING A COLUMN-READ TRANSISTOR FOR READING SIGNALS

BACKGROUND OF THE INVENTION

1. Field of the Invention

The present invention relates a method and architecture of controlling an active pixel element, and more particularly, to a method and architecture of controlling an active pixel element sequence.

2. Description of the Prior Art

Figure 1:
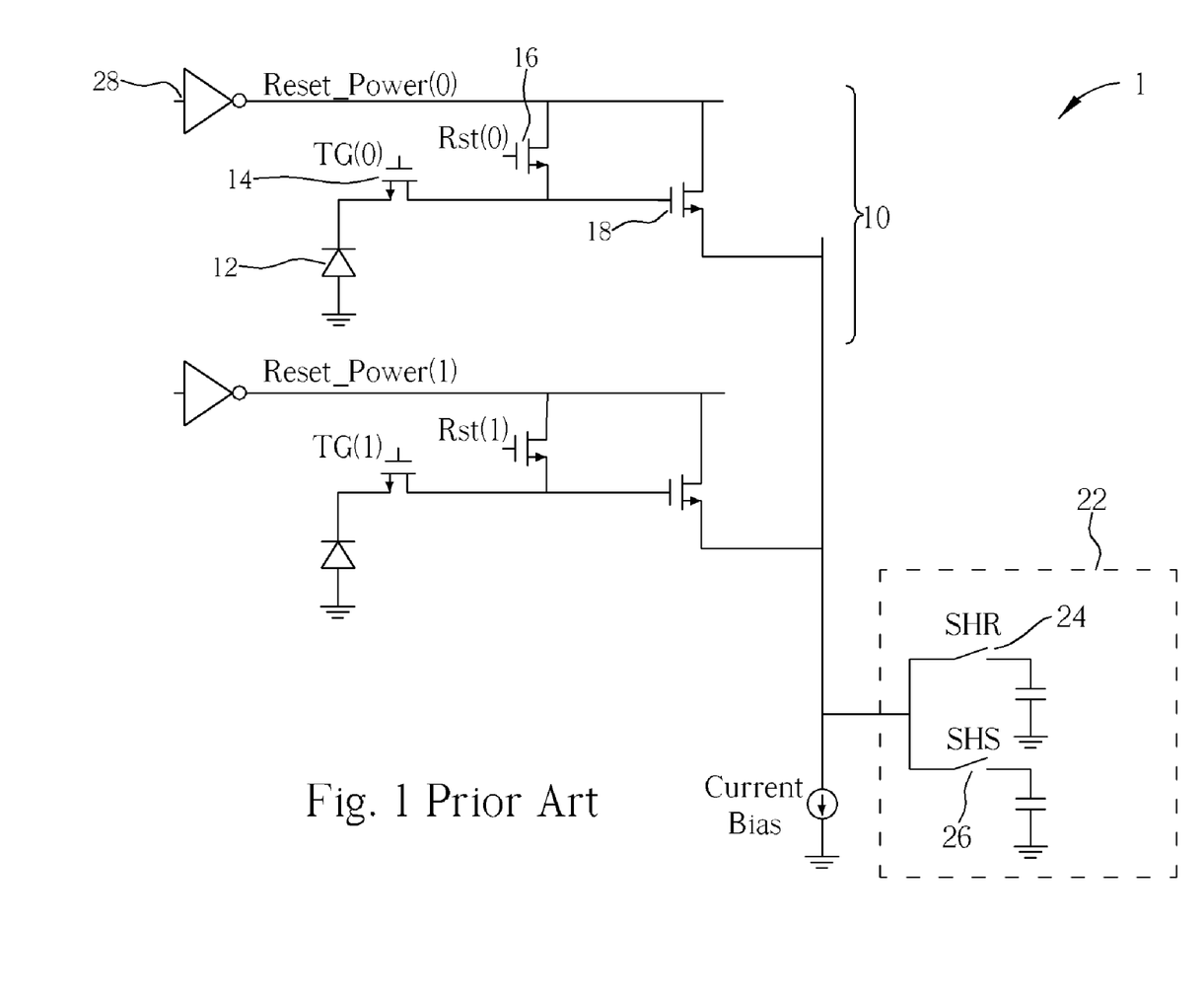
FIG. 1 illustrates a diagram of an active pixel element of an image sensor array according to the prior art.

Please refer to FIG. 1. FIG. 1 refers to a diagram of an active pixel element 10 of an image sensor array 1 according to the prior art. The active pixel element 10 includes a sensor 12, a transfer transistor 14, a reset transistor 16, and a source follower 18. As the operation between the transistors 14-18 and the sensor is well known to those having average skilled in this art, therefore further detailed explanation will not be reiterated for the sake of brevity.

A read circuit is utilized for reading the signal of each column of the active pixel element 10 of the image sensor array 1. The reading circuit 22 includes a reset signal switch (SHR) 24 and a light signal switch (SHS) 26 for respectively controlling storage of the reset signal and the light signal. Furthermore, a power source 28 is for providing power to the active pixel element 10 of a same row.

Figure 2:
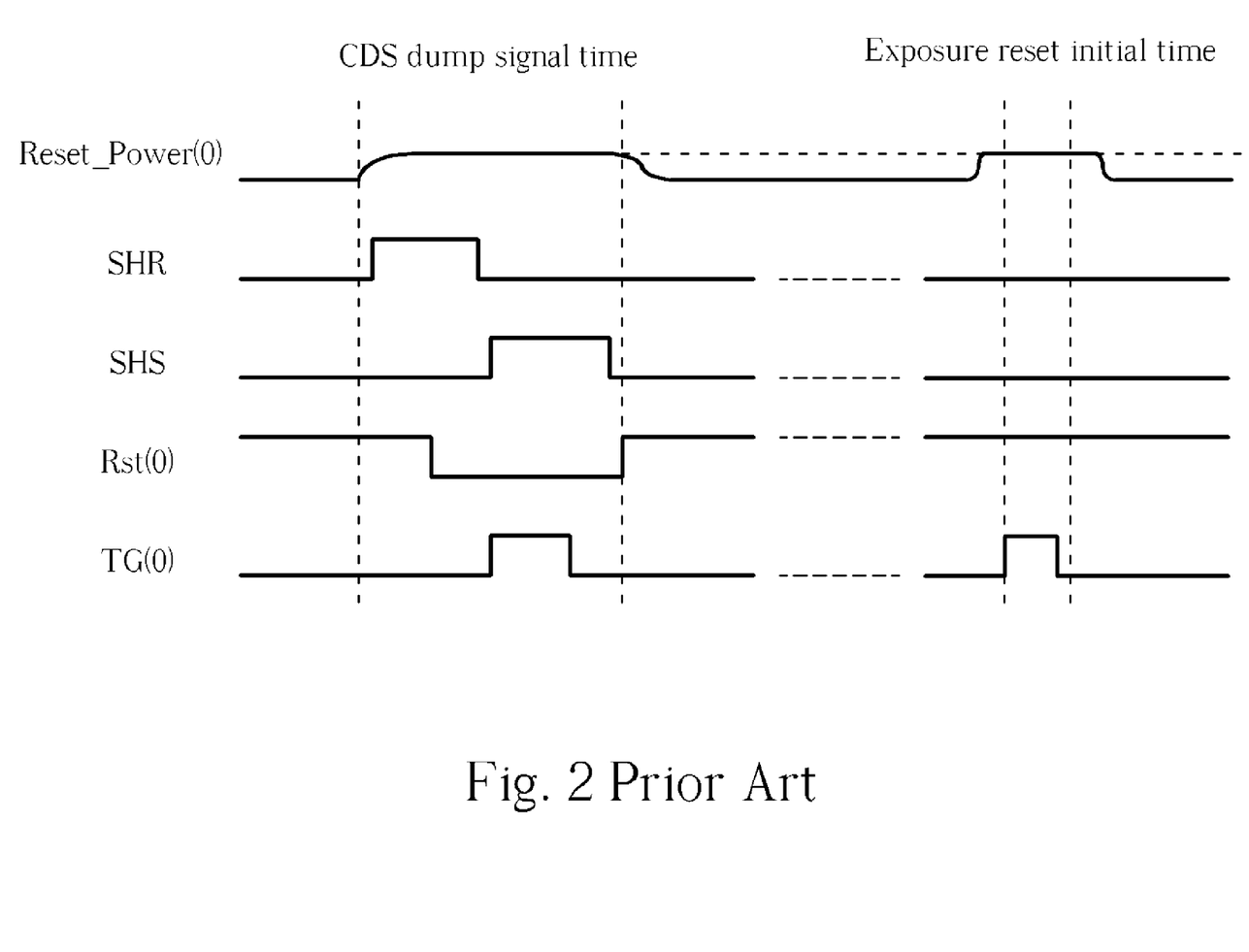
FIG. 2 illustrates a time sequence diagram of controlling the active pixel element of the image sensor array of FIG. 1 and two switches of a read circuit.

Please refer to FIG. 2. FIG. 2 illustrates a time sequence diagram of controlling the active pixel element 10 of the image sensor array 1 of FIG. 1 and two switches 24, 26 of a read circuit 22. FIG. 2 illustrates an example of controlling the sequence of the active pixel element 10 at a $0^{th}$ row in an exposure state, when the sensor 12 of the active pixel element 10 at the $0^{th}$ row is being reset, the transfer transistor 14 of the $0^{th}$ row will be turned on while the reset transistor 16 is still turned on until the transfer transistor 14 is turned off to execute exposure after the $0^{th}$ row.

The active pixel element 10 is unable to record gate voltage of the source follower 18 when exposure is executed, therefore an initial voltage must be created for the light signal, and a reset signal must be read before reading the light signal. So, in a CDS dumping data state, when the reset signal of the active pixel element 10 at the $0^{th}$ row is being read, the SHR 24 is turned on, and the reset transistor 16 of the $0^{th}$ row is also turned on to read the reset signal. Next, the SHR 24 and the reset transistor 16 are turned off, and the SHS 26 and the transfer transistor 14 of the $0^{th}$ row are turned on to read the light signal.

As illustrated in FIG. 2, the size of reset reference voltage of the active pixel element 10 during the execution of the reset operation and the size of reset reference voltage during the reading of the reset signal are similar, thus there will not be a problem caused by a difference of reset reference voltages under the two different statuses. However, a problem does arise, as there is a reset reference voltage difference between each column and between each row in the image sensor array.

Figure 3:
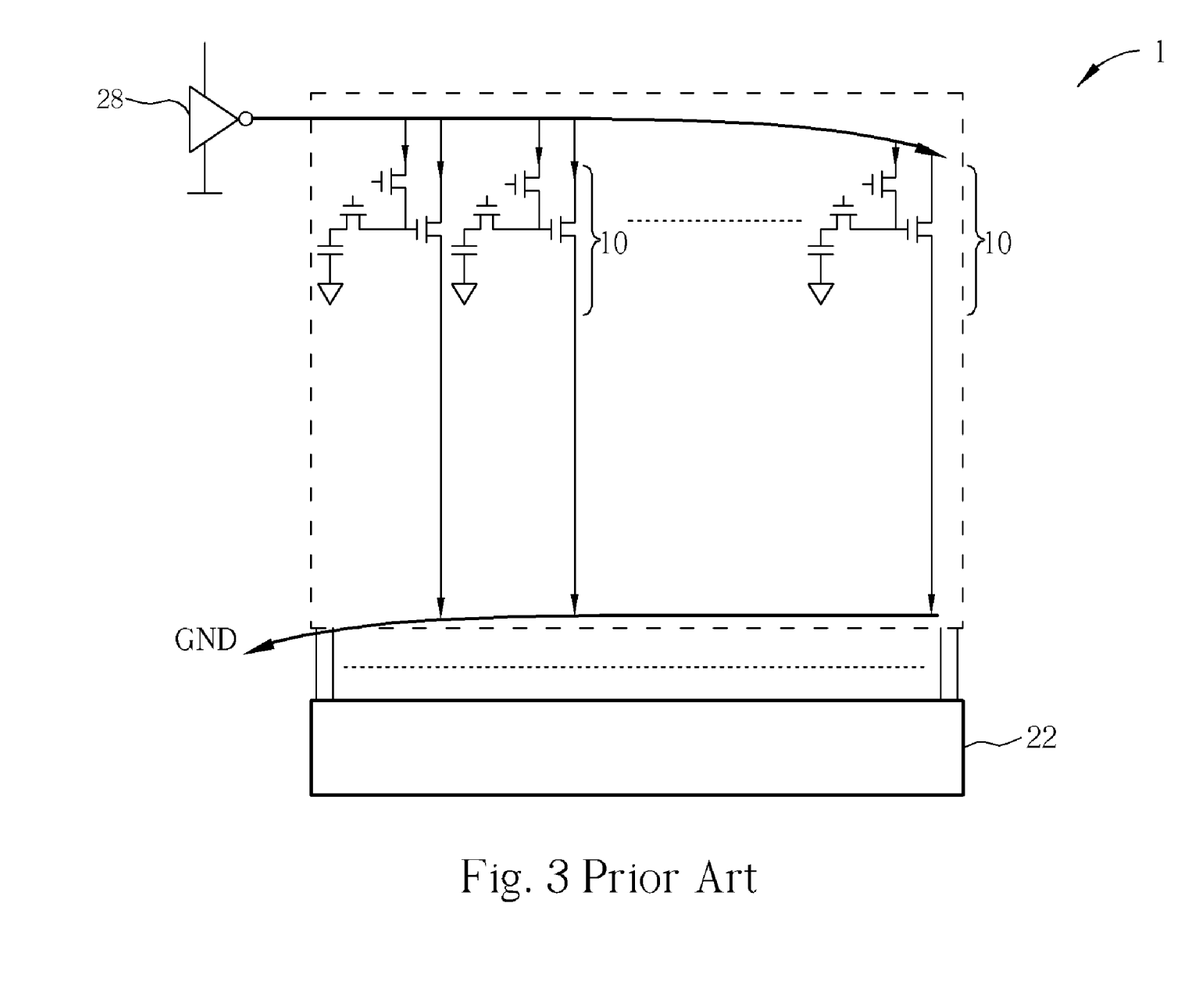
FIG. 3 illustrates a diagram of a voltage drop generated between each column on a same row of the image sensor array of FIG. 1.

Please refer to FIG. 3. FIG. 3 illustrates a diagram of a voltage drop generated between each column on a same row of the image sensor array 1 of FIG. 1. When the reset operation is executed, all the source followers 18 on the $0^{th}$ row will still be turned on, as current generated by the source follower 18 on the $0^{th}$ row and impendence of the power cable of the power source 28 form a voltage drop, each active pixel element 10 of the $0^{th}$ row will have a different reset reference voltage. Similarly, as power is respectively provided to each row, therefore impendence of the power cable of each row is different, furthermore, there is a difference in the current drop generated by each source follower 18 on each different row, hence there is also a problem of the reset reference voltage being different among each row in the image sensor array 1, which can cause a serious difference in the initial exposure value (EV).

Figure 4:
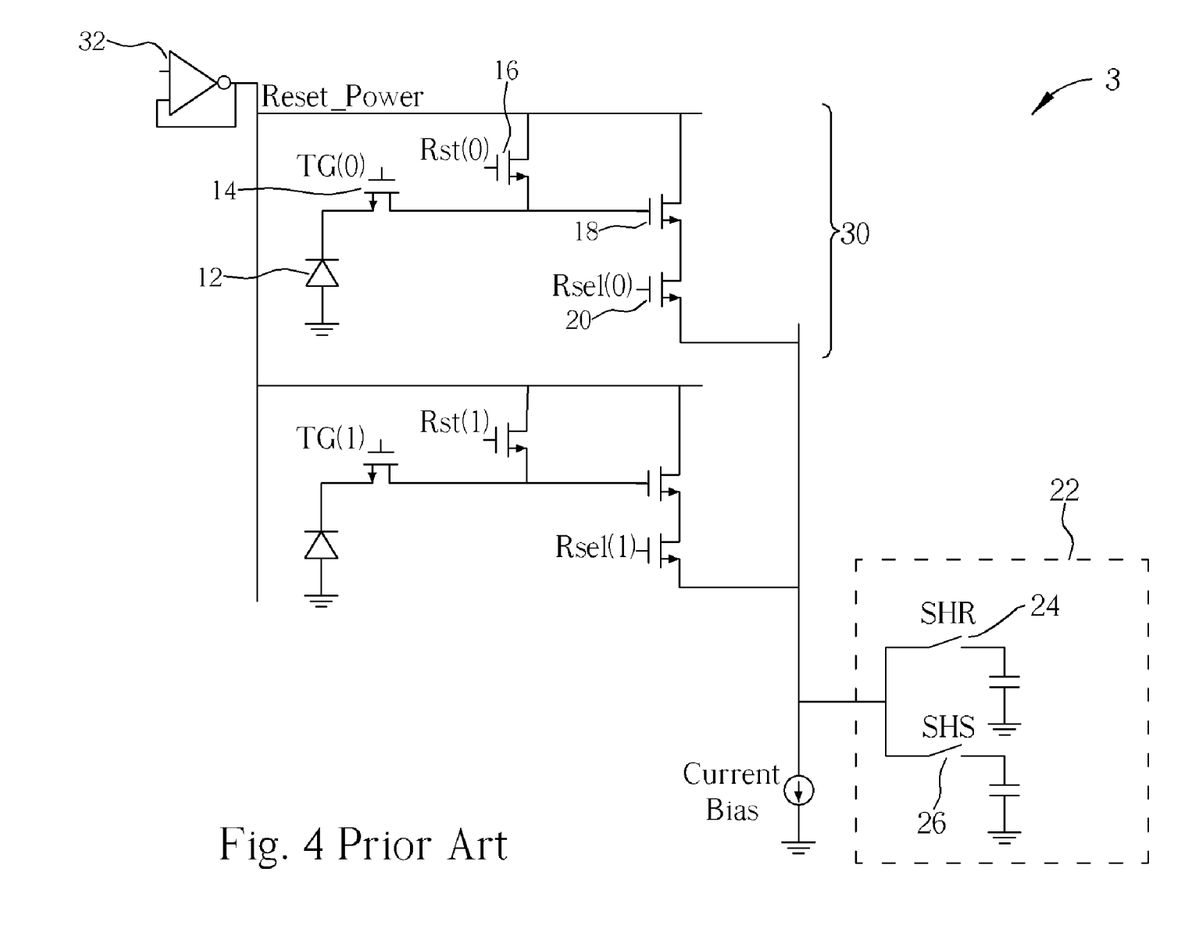
FIG. 4 illustrates a diagram of an active pixel element of an image sensor array according to another prior art.

Please refer to FIG. 4. FIG. 4 illustrates a diagram of an active pixel element 30 of an image sensor array 3 according to another prior art. The difference with the active pixel element 30 and the active pixel element 10 lies in a row selector 20. Furthermore, a power source 32 of FIG. 3 is utilized for providing power to all active pixel elements 30 of the image sensor array 3.

Figure 5:
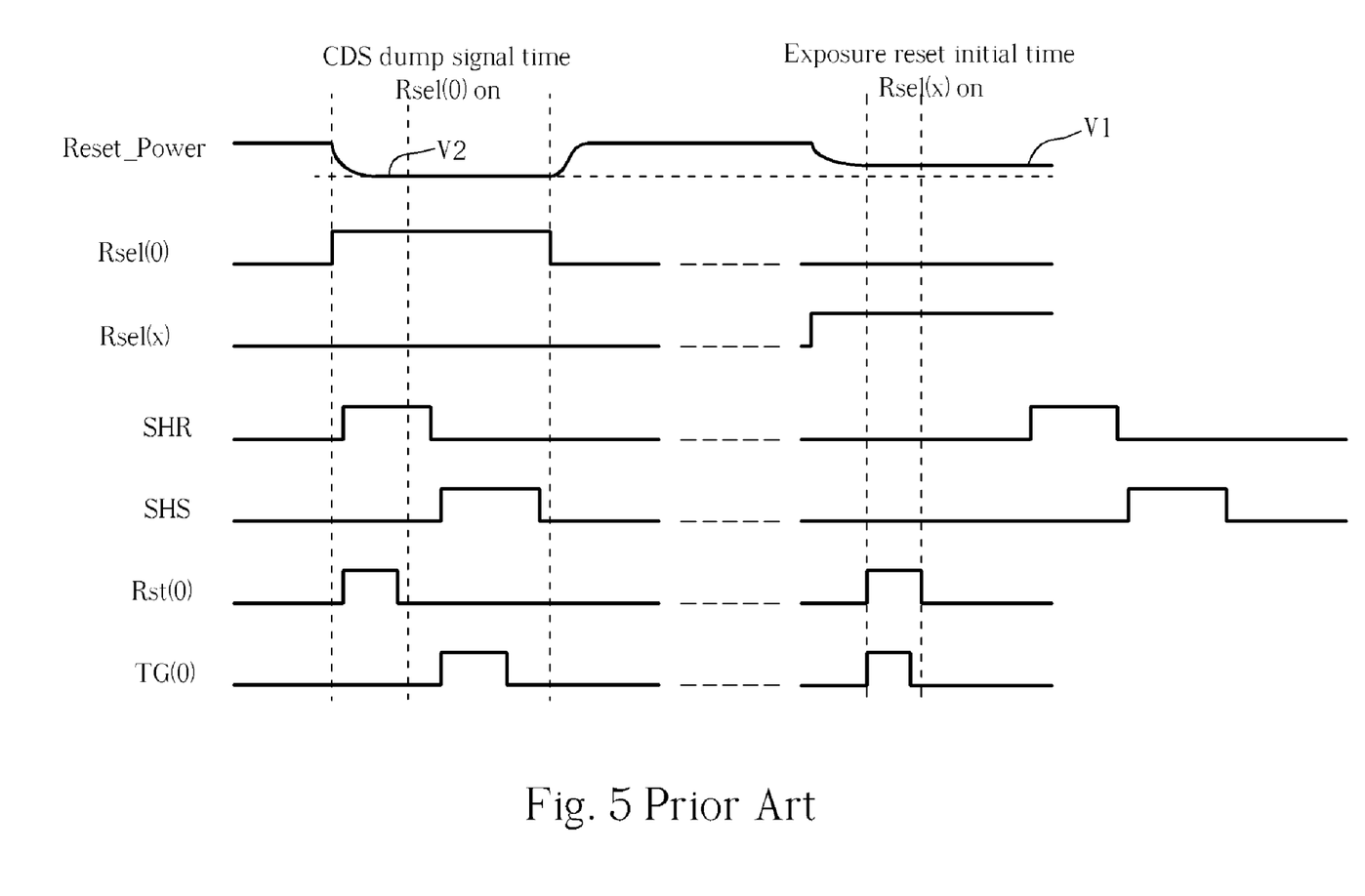
FIG. 5 illustrates a time sequence diagram of controlling the active pixel element of the image sensor array of FIG. 3 and two switches of a read circuit.

Please refer to FIG. 5. FIG. 5 illustrates a time sequence diagram of controlling the active pixel element 30 of the image sensor array 3 of FIG. 3 and two switches 24, 26 of a read circuit 22. FIG. 5 illustrates an example of controlling the sequence of the active pixel element 30 at the $0^{th}$ column, when the sensor 12 of the active pixel element 30 at the $0^{th}$ column is being reset, the transfer transistor 14 and the reset transistor 16 of the $0^{th}$ column will be turned on and the row selector 20 is turned off, as this time maybe the time of reading the light signal at an $X^{th}$ column, until the transfer transistor 14 and the reset transistor 16 are respectively turned off to execute exposure after the $0^{th}$ column.

At the same time the sensor 12 of the $0^{th}$ column is being reset, the active pixel element 30 of the $X^{th}$ column is at a signal reading status, thus the row selector 20 of the $X^{th}$ column is still turned on, and all the source followers 18 of the $X^{th}$ column are still turned on, therefore the reset reference voltage will be lowered to V1, if this value subtracts a threshold voltage of the reset transistor 16, then the result will be a gate voltage of the source follower 18, which is also the initial voltage of the light signal.

When the reset signal of the active pixel element 30 of the $0^{th}$ column is being read, the reset signal switch 24 is turned on, the row selector 20 and the reset transistor 16 are also turned on to read the reset signal. However, at this time the reset reference voltage is V2 and not V1, this is because all the row selectors 20 of the $0^{th}$ column are turned on, and none of the row selectors 20 of the $X^{th}$ column are turned on, there is current flowing into the source follower 18 of the $0^{th}$ column, and there is a slight difference between the actual characteristics of transistor and the power cable, which causes different voltage drops in the reset reference voltage. Therefore, the initial voltage of the light signal that is read is the threshold voltage of the reset transistor 16 subtracted from the voltage V2.

Therefore, when the reset signal is read, the drain voltage of the reset transistor 16 is V2, which is different from the drain voltage V1 of the reset transistor 16 when exposure is executed, in another words, the reset reference voltage of each active pixel element 30 of the image sensor array 3 at two different status is different. As for an active pixel element 30, the problem of the reset reference voltage difference is present when the reset operation is executed and when the reset signal is read. And as for the image sensor array 3, the problem of reset reference voltage difference between each column and between each row is also present.

SUMMARY OF THE INVENTION

The claimed invention relates to a method for controlling an active pixel element. The method comprises turning on a transfer transistor of the active pixel element and a reset transistor of a drain of the transfer transistor coupled to a source to reset a sensor coupled to the transfer transistor; turning off the reset transistor and the transfer transistor so that the sensor is exposed; a column-read transistor of a source of a source follower coupled to the drain maintaining an off status, and turning on the reset transistor when the transfer transistor is still turned off so that drain voltage of the reset transistor is identical when a reset signal is read and when the sensor is being reset, a gate of the source follower is coupled to a source of the reset transistor; and turning off the reset transistor and turning on the column-read transistor to read the reset signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, consumer electronic equipment manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

Figure 6:
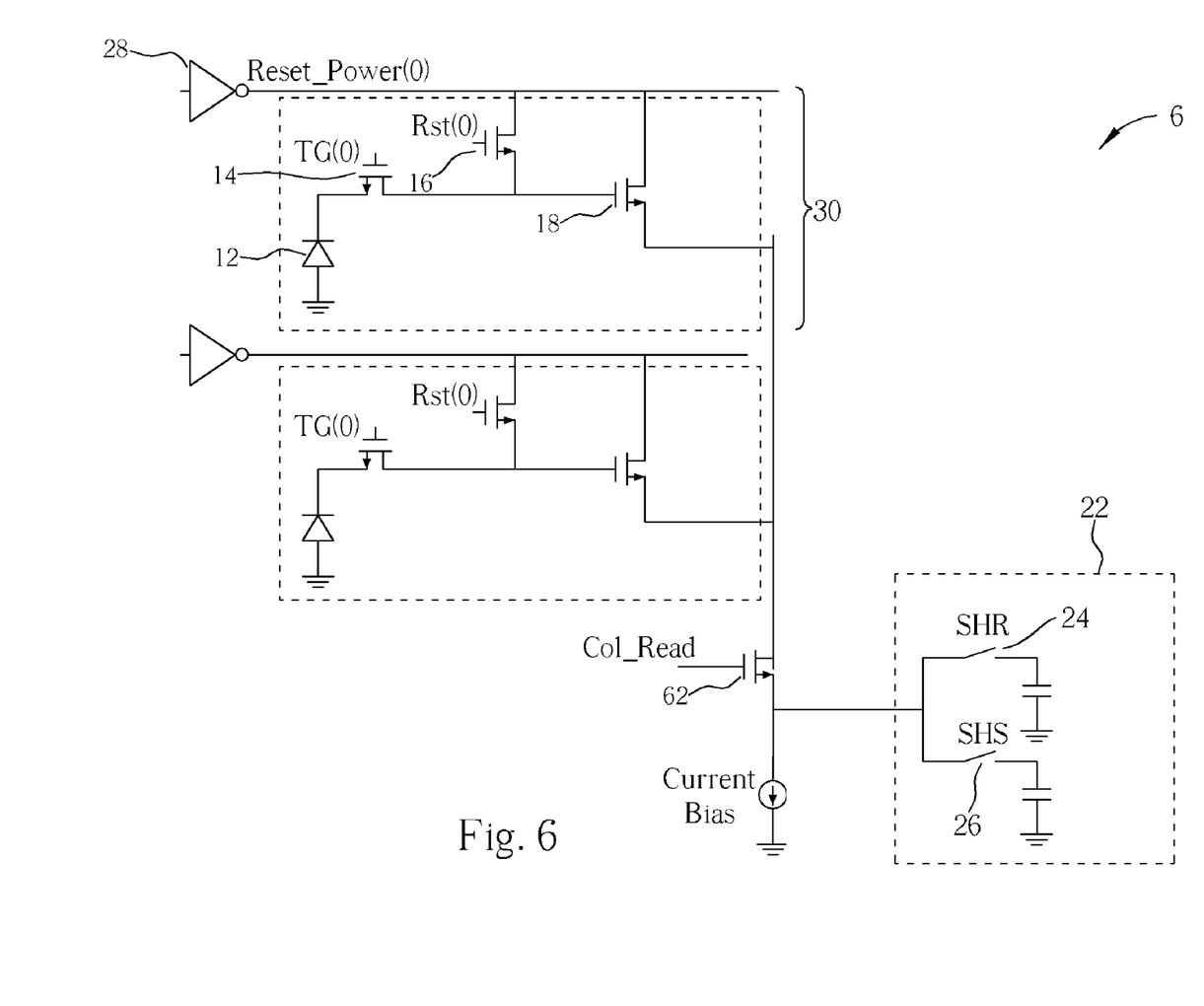
FIG. 6 illustrates a diagram of an image sensor array according to an embodiment of the present invention.

Please refer to FIG. 6. FIG. 6 illustrates a diagram of an image sensor array 6 according to the present invention. The main architecture of the image sensor array 6 is similar to the image sensor array of FIG. 1, the only difference with the image sensor array 6 is the column-read transistor 62, which is utilized for controlling signal reading of a column signal.

Figure 7:
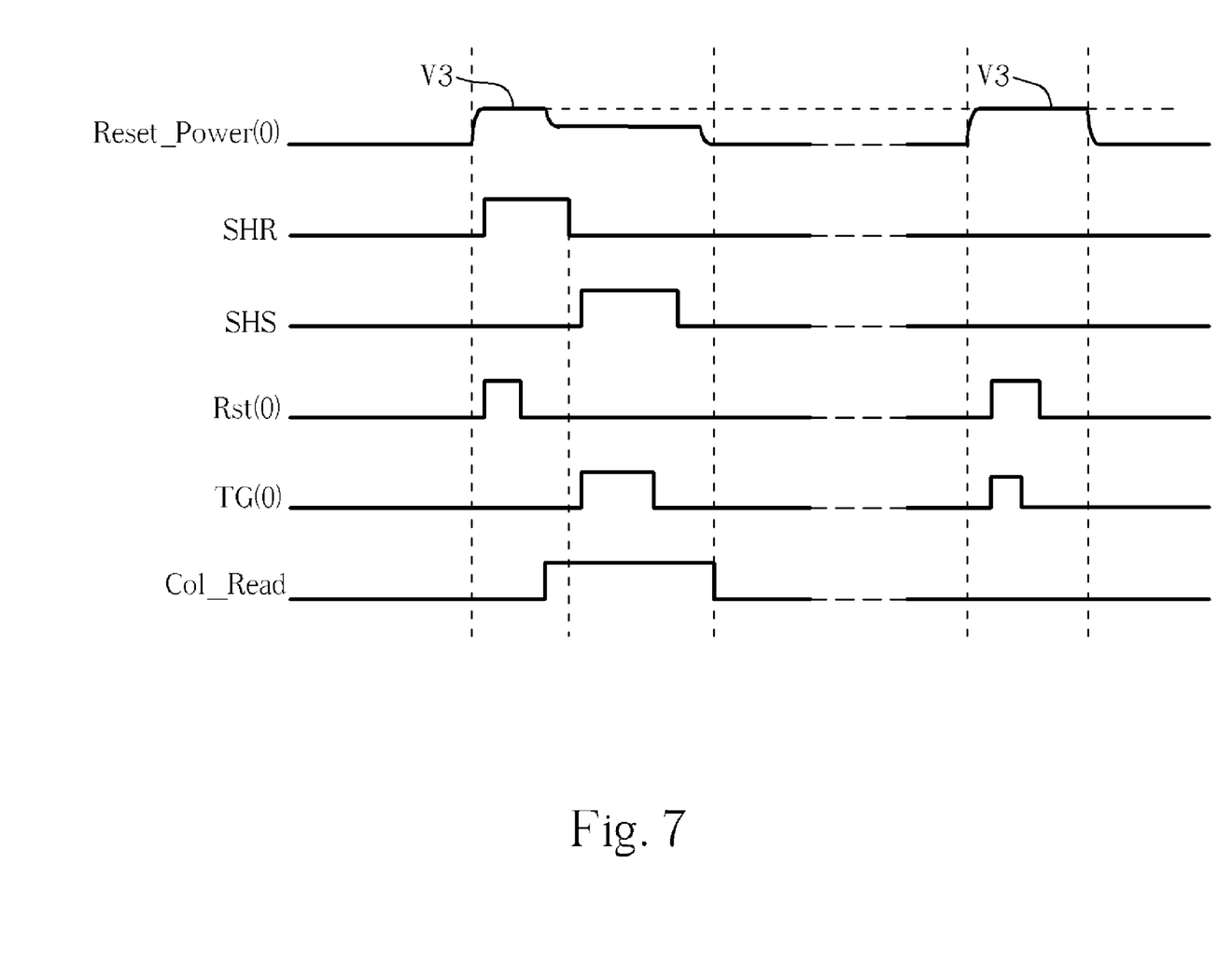
FIG. 7 illustrates a time sequence diagram of controlling the image sensor array of FIG. 6.

Please refer to FIG. 7. FIG. 7 illustrates a time sequence diagram of controlling the image sensor array 6 of FIG. 6. When the sensor 12 is being reset, the reset transistor 16 and the transfer transistor 14 are turned on such that the column-read transistor is still turned off, at this time the reset reference voltage is V3. When the reset signal is being read, the reset transistor 16 and the reset signal switch 24 are first turned on, the column-read transistor 62 is still turned off, at this time the reset reference voltage is also V3, hence the initial voltage values are the same. The column-read transistor 62 is turned on after the reset transistor 16 is turned off in order to read the reset signal. After the reset signal is being read, the light signal will be read next, the column-read transistor 62 will still be turned on, and lastly the transfer transistor 14 and the SHS 26 are turned on to read the light signal.

Figure 8:
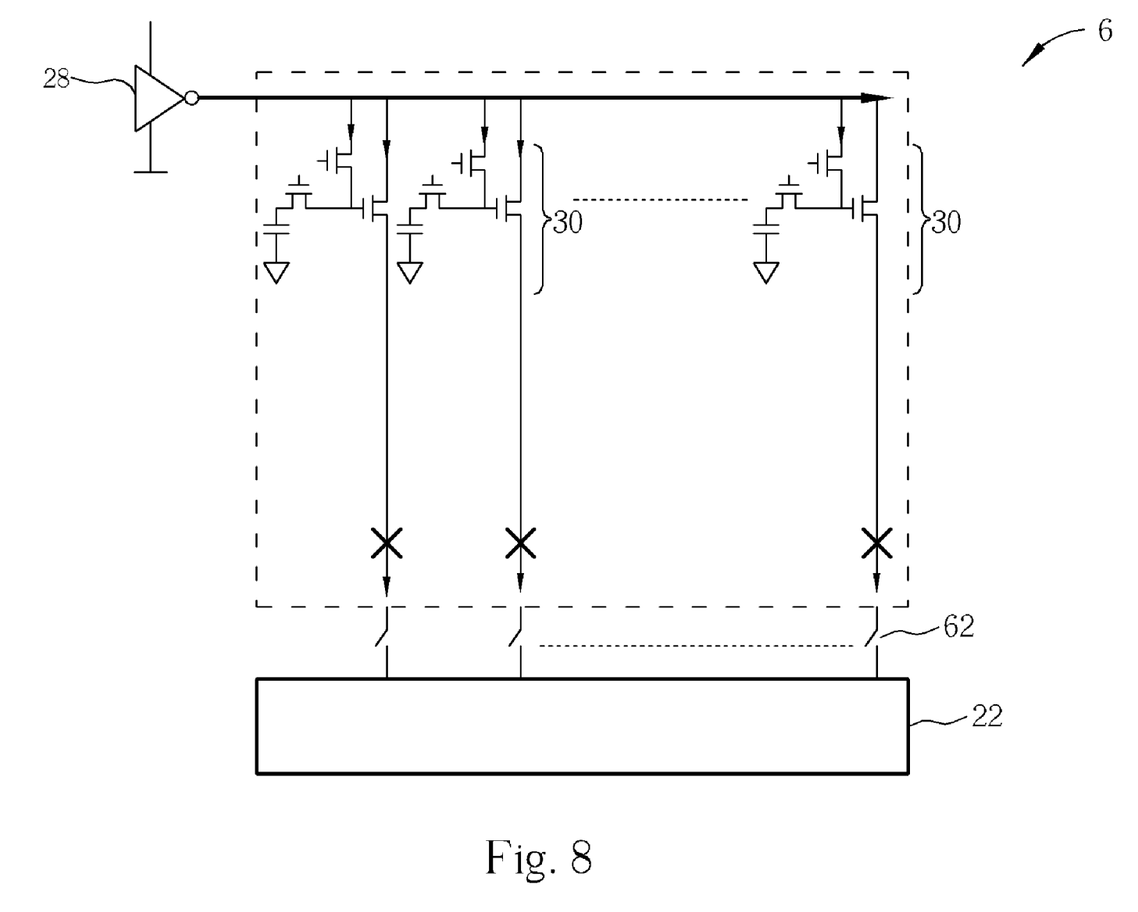
FIG. 8 illustrates a diagram of reset reference voltage between each column on a same row of the image sensor array of FIG. 6.

The present invention is realized by controlling the time sequence of the column-read transistor 62 such that all the source follower 18 on the same row are turned off during exposure and when the reset signal is being read, therefore the reset reference voltage of each active pixel element 30 on the same row is identical. Please refer to FIG. 8. FIG. 8 illustrates a diagram of the reset reference voltage between each column on a same row of the image sensor array 6 of FIG. 6. Thus, the present invention can solve the problem of the reset reference voltage difference between each column and between each row. Furthermore, as the column-read transistor 62 is not installed within the active pixel element 30, therefore the size of the light surface of the sensor 12 of the active pixel element 30 is not affected.

Figure 9:
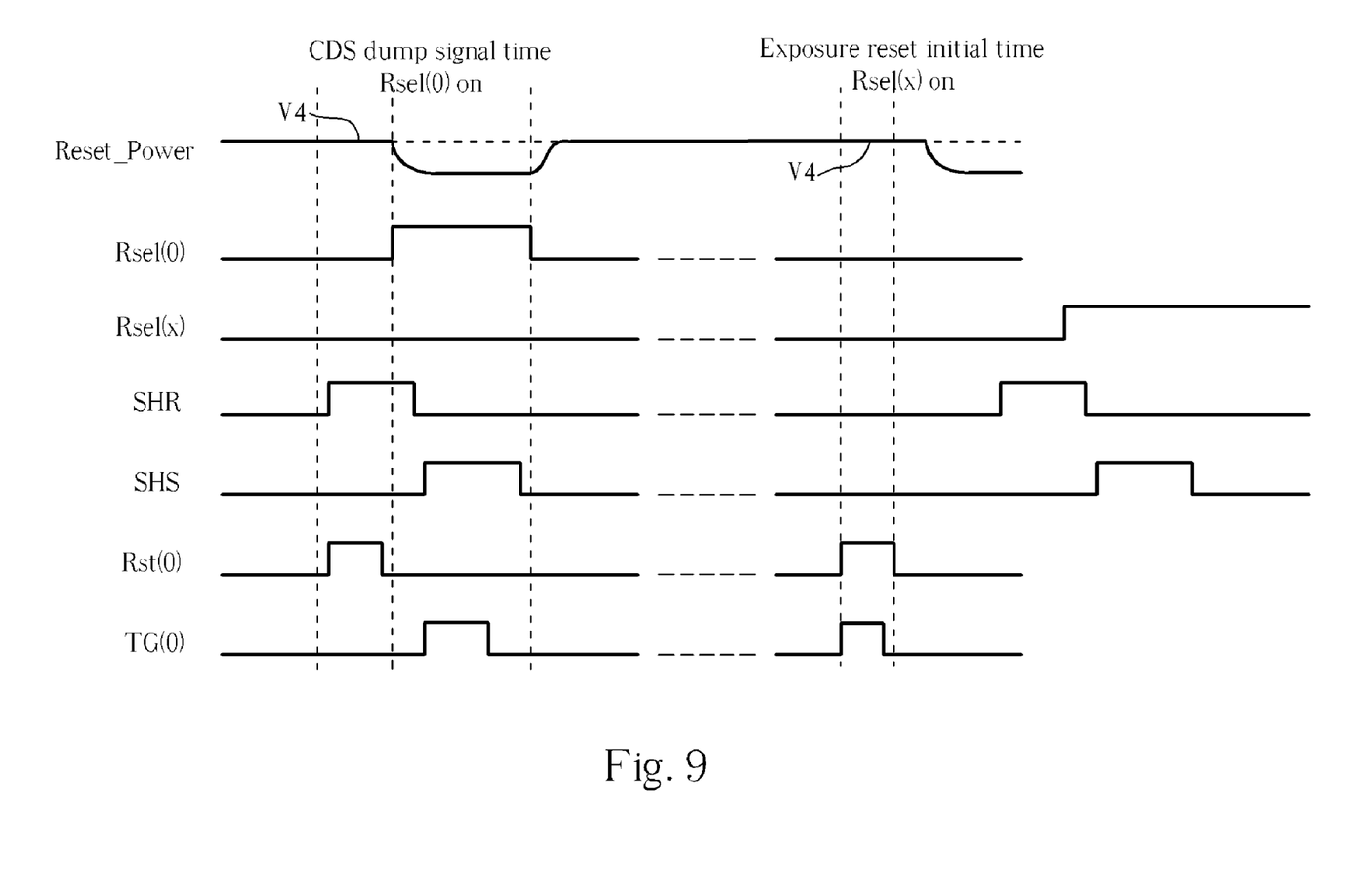
FIG. 9 illustrates a time sequence diagram of controlling the image sensory array of FIG. 4.

Please refer to FIG. 9. FIG. 9 illustrates a time sequence diagram of controlling the image sensory array 3 of FIG. 4. As a voltage drop is generated when the source follower 18 is turned on, therefore the time sequence of the signal in the present invention has been modified such that the reset reference voltages at the time when the reset signal is being read and the sensor 12 during exposure are identical.

The reset transistor 16 and the transfer transistor 14 are turned on and all the row selectors 20 on the image sensor array 3 are turned off when the sensor 12 is being reset at the $0^{th}$ row. When the resetting operation and exposure operation are executed at the $0^{th}$ row, and the $X^{th}$ is reading signal at this time, the row selector 20 of the $X^{th}$ row is to be turned on at a later time, in other words, after the reset transistor 16 and the transfer transistor 14 are turned off at the $0^{th}$ row, the row selector 20 of the $X^{th}$ row will then be turned on, in this way, when the sensor 12 of the $0^{th}$ row is being reset and exposed, the reset reference voltage will be identical to voltage V4 provided by the power source 28. Then the threshold voltage of the reset transistor 16 subtracted from V4, and the result is the gate voltage (i.e., the initial voltage) of the source follower 18 during exposure.

In reading the reset signal of the $0^{th}$ row, the reset transistor 16 of the $0^{th}$ row is first turned on, and all of the row selectors 20 are still turned off so that the reset reference voltage can be maintained at V4, in this way the gate voltage of the source follower 18 is identical to the gate voltage of the source follower 18 during exposure. Next, after the reset transistor 16 is turned off, the row selector 20 of the $0^{th}$ row is turned on to read the reset signal. Although in the processing of reading signal, the drain voltage of the reset transistor 16 is lowered again, but this will not affect the initial voltage value when reading exposure.

In comparison to the prior art, the present invention, by controlling the time sequence, allows the reset reference voltages to be identical during exposure and when the reset signal is read, in order to prevent the problem from occurring where the reset reference voltage between each column and between each row are different.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling an active pixel element, the method comprising:

turning on a transfer transistor of the active pixel element and a reset transistor having a source coupled to a drain of the transfer transistor for resetting a sensor coupled to the transfer transistor;

turning off the reset transistor and the transfer transistor so that the sensor is exposed;

when a column-read transistor, having a drain coupled to a source of a source follower, is in an off state, and the reset transistor is in an off state, turning on the reset transistor so as to make a drain voltage of the reset transistor when reading a reset signal same as the drain voltage of the reset transistor when resetting the sensor, a gate of the source follower being coupled to a source of the reset transistor; and turning off the reset transistor and turning on the column-read transistor to read the reset signal.

2. The method of claim 1 further comprising the transfer transistor being still turned off, and turning on the reset signal switch of the read circuit coupled to a source of the column-read transistor when the reset transistor is turned on to read the reset signal.

3. The method of claim 2 further comprising turning on the transfer transistor and a light signal switch of the read circuit when the column-read transistor is still turned on and after the reset switch is turned off to read light signals.

4. A method for controlling an active pixel element, the method comprising:

a row selector of the active pixel element and all of the row selectors of the active pixel element positioned on a same column being still turned off, turning on a transfer transistor of the active pixel element and a reset transistor of a drain of the transfer transistor coupled a source to reset a sensor coupled to the transfer transistor;

turning off the reset transistor and the transfer transistor so that the sensor is exposed;

a row selector of the active pixel element and all of the row selectors of the active pixel element positioned on a same column being still turned off, and turning on the reset transistor when the transfer transistor is still turned off so that drain voltage of the reset transistor is identical when a reset signal is read and when the sensor is being reset, a gate of the source follower being coupled to a source of the reset transistor; and turning off the reset transistor and turning on a row selector of the active pixel element to read the reset signal.

5. The method of claim 4 further comprising the transfer transistor being still turned off, and turning on the reset transistor, turning on a reset signal switch coupled to a read circuit of a source of the row selector to read the reset signal.

6. The method of claim 5 further comprising turning on the transfer transistor and a light signal switch of the read circuit when the row selector of the active pixel element is still turned on and after the reset switch is turned off to read light signals.

* * * * *